April 11, 1950

C. A. LOUCKS 2,503,828

SEED PLANTER

Filed Aug. 1, 1945

INVENTOR
C.A.Loucks

BY

ATTORNEYS

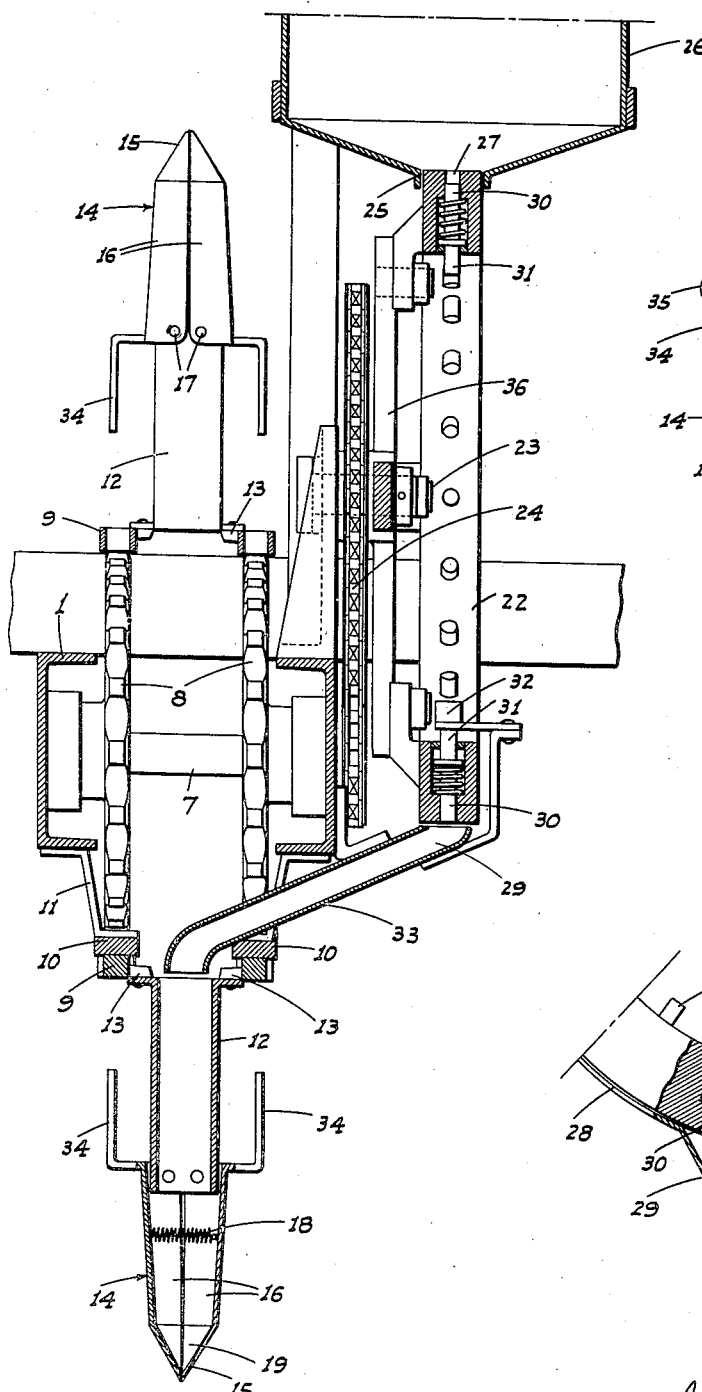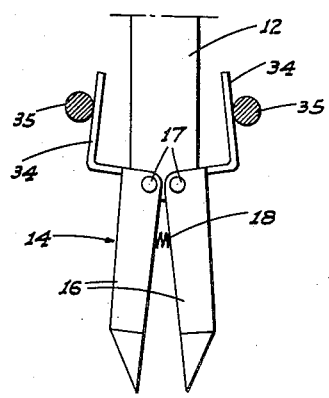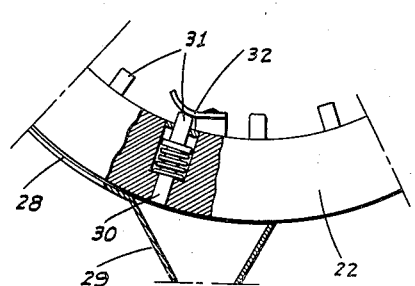

Patented Apr. 11, 1950

2,503,828

UNITED STATES PATENT OFFICE 2,503,828

SEED PLANTER

Claude A. Loucks, Solano County, Calif., assignor of one-half to Albert M. Jongeneel Application August 1, 1945, Serial No. 608,152

3 Claims. (Cl. 111—89)

This invention relates in general to agricultural machinery and in particular the invention is directed to, and it is an object to provide, an improved automatic seed planter for row crops.

Another object of this invention is to provide an automatic seed planter for row crops which is operative to plant the seeds one at a time along a row and with predetermined spacing between the seeds whereby to assure of evenly spaced plants and to avoid the necessity of subsequent hand thinning or blocking. The machine is well suited to the planting of any crop of which the seeds are of substantial size, such as beans, peas, corn, etc., or any relatively small seed pelleted to give it a substantially greater size.

Another object of the present invention is to provide an automatic seed planter, as above, which includes a plurality of seed depositing shoes mounted to successively penetrate and withdraw from the ground upon advance of the machine and to remain stationary as long as so engaged in the ground; said shoes being hollow, segmental, and mounted for opening and closing movement, there being means to automatically deposit a single seed in said shoes when the same are closed, and to open said shoes when penetrated into the ground whereby to then release and plant the seed. As there is no movement of the shoes relative to the ground when said shoes are penetrated thereinto, the shoes cause no furrowing and a minimum of disturbance of the usually carefully prepared seed beds.

A further object of the invention is to provide a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 2 is an enlarged cross section on line 2—2 of Figure 1.

Figure 3 is an enlarged cross section on line 3—3 of Figure 1.

Figure 4 is an enlarged fragmentary sectional elevation of the seed delivery rotor and the associated seed receiving funnel.

Figure 1:
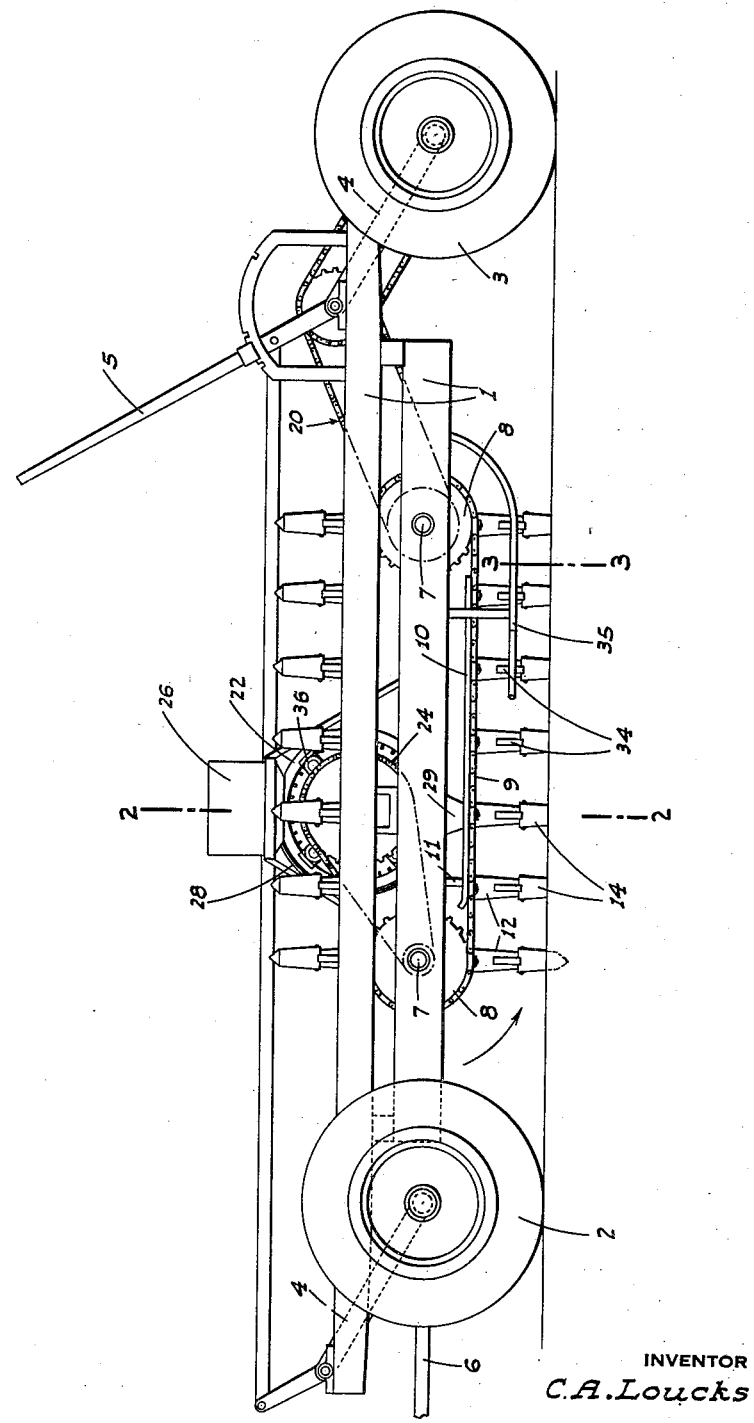
Figure 1 is a side elevation of the improved automatic seed planter.

Referring now more particularly to the drawings and the characters of reference marked thereon, the numeral 1 indicates a rigid longitudinal frame supported above and for movement along the ground by a transversely spaced pair of front wheels 2, and a transversely spaced pair of rear wheels 3. The wheels 2 and 3 are mounted in connection with the frame 1 for simultaneous vertical adjustment by means indicated generally at 4, whereby to selectively and adjustably regulate the elevation of frame 1; said adjusting means including a manually controlled lever 5. At its forward end the machine is provided with a draft tongue or hitch 6 adapted for connection to a tractor.

Between the front and rear wheels the frame 1 supports the planting mechanism which embodies the essence of this invention and which planting mechanism is constructed as follows:

A pair of transverse shafts 7 are journaled on the main frame 1 in spaced relation lengthwise of the latter, and each of said shafts carries a transversely spaced pair of sprockets 8, corresponding front and rear spockets being alined. Endless heavy duty chains 9 run about and extend between corresponding ones of the spockets 8, and the lower runs of the chains 9 abut from below against rigid horizontal rails 10 supported from the frame 1 by brackets 11.

At evenly spaced points thereabout the assembly of chains 9 is provided with a plurality of radially outwardly projecting seed tubes 12, which tubes are fixed at their inner ends to the chains 9 by means of suitable attachment brackets or links 13.

At its outer end each of the seed tubes 12 is provided with an outwardly projecting seed depositing shoe indicated generally at 14, and which shoe is hollow, open at its inner end, pointed at its outer end as at 15, and formed of a pair of matching half round segments 16. The segments 16 are pivoted at their inner ends as at 17 to the outer end of the corresponding seed tube 12 for lateral swinging movement of said segments 16 between closed position as shown in Figure 2 to open position as shown in Figure 3. The segments 16 are normally held in the closed position of Figure 2 by means of a tension spring 18 connected therebetween. When the segments 16 are closed, the point 15 is similarly closed forming a seed retaining pocket 19 therein.

With advance of the implement the chains 9 are driven, with the lower runs thereof moving at exactly the ground speed of the machine but in an opposite direction, by a drive assembly connected between the axle of the rear wheels 3 and the adjacent cross shaft 7, said drive assembly being indicated generally at 20. When relatively moving with the lower runs of the chains 9, the shoes 14 project into the ground and remain stationary therein, causing no substantial disturbance of the seed bed.

Rearwardly of the leading or foremost cross shaft 7 the machine includes a unit operative to feed seeds one at a time and in timed relation into the seed tube 12 from above; said unit being constructed as follows:

A seed delivery rotor 22 is supported from the main frame 1 and to one side of the assembly of chains 9 by a transverse tubular shaft 23. The shaft 23 is driven by a chain and sprocket assembly 24 from one of the cross shafts 7. At the top the rotor runs in a throat 25 in the bottom of a seed hopper 26; said rotor being formed about the periphery thereof with a plurality of circumferentially spaced seed receiving pockets 27. It will be seen with turning of the rotor 22 the pockets 27 will each pick up a seed as said pockets traverse the throat 25. Between the throat 25 and the bottom of the rotor in the direction of rotation of the latter the periphery of the rotor runs in close relation to an arcuate guard or seed retaining band 28 which prevents the seeds in the pockets 27 from escaping therefrom. At the bottom of the rotor and at the lower end of the seed retaining band 28 there is a funnel 29 which opens to the periphery of said rotor. As the seed receiving pockets 27 successively reach the funnel 29 the seeds fall from said pockets into the funnel. To assure discharge of the seeds from the pockets 27, each pocket includes a normally spring retracted push out pin 30 which includes a part 31 projecting radially inward from the rim portion of said rotor. As the pockets 27 reach the funnel 29 the pin portions 31 engage a cam 32 which causes the pins 30 to shift radially outwardly and to project the seed from the corresponding pocket 27.

A tubular chute 33 leads from the funnel 29 downwardly and laterally inwardly to a point of discharge between the lower runs of the chains 9. The chains 9 and the rotor 22 are timed so that when a seed is discharged from one of the pockets 27 and runs down the tubular chute 33, one of the seed tubes 12 is then positioned below said chute for reception of the seed. The seed as fed into the tube 12 of each shoe 14 falls downwardly into the seed pocket 19 therein.

After having a seed placed therein the shoes 14 travel rearwardly relative to the frame 1, and at a predetermined point to the rear of the chute 33, said shoes are opened and the seed dropped from the pocket 19 into the ground. This opening of the shoes 14 is accomplished as follows:

Each of the shoe segments 16 is fitted on the outside with an upstanding cam finger 34, while the frame 1 supports, on opposite sides of the path of movement of the seed tubes 12 in the lower run of the assembly of chains 9, a transversely spaced pair of rearwardly converging cam rods 35. As the shoes 14 move rearwardly the fingers 34 engage and are swung laterally by the rods 35 causing opening of the shoe segments 16 and resultant dropping of the seed into the ground. When the fingers 34 run off the rear ends of the rods 35 the shoe segments 16 return, under the influence of spring 18, to normal closed position. Rotor 22 is supported from shaft 23 by a spider 36 detachably secured to the rotor so that the latter may be readily removed and replaced by another having different sized seed pockets, so that the one machine, with a set of rotors, will take care of the planting of seeds of all sizes.

With the above described automatic planting machine, row crops can be seeded effectively and rapidly with the seeds planted individually and in evenly spaced relation. This produces a crop which needs little, if any, thinning or blocking, and a crop in which the individual plants may mature to the best advantage.

Further, by reason of the fact that the shoes only penetrate the ground and do not move therein lengthwise of the direction of travel of the machine, the seed bed is relatively undisturbed and after planting requires only a light rolling to close the soil about the planted seeds.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A seed planting machine comprising a wheel mounted frame to be drawn along the ground, an endless carrier chain mounted on the frame and having a lower run extending substantially parallel with the ground for a substantial distance, means to drive the chain so that such lower run moves at the same speed as the wheel mounted frame but in the opposite direction, a plurality of seed depositing shoes spaced substantially equally apart along the length of the chain and projecting outwardly therefrom, the length of the shoes being such that the shoes will be projected into the ground along the lower run of the chain, a means on the frame operable to deposit a seed into each shoe at a predetermined point in the travel of the main frame relative to such shoe while the shoe is in the ground, and means to subsequently release the seed from the shoe at another predetermined point in the travel of the main frame relative to such shoe and while the shoe is still in the ground.

2. A structure as in claim 1 including a member on the main frame engageable with the lower run of the chain and operable to prevent upward deflection of such lower run of the chain.

3. A seed planting machine comprising a frame supported above and for movement along the ground, a plurality of seed depositing shoes, an endless driven unit mounted on the frame for turning movement lengthwise thereof, means mounting the seed depositing shoes on said driven unit in substantially equally spaced apart relation along the length thereof and projecting outwardly therefrom, said shoes being hollow and adapted to open and close at their outer ends, means to feed a seed into each shoe when the latter is closed and at a point projecting toward the ground, and means to open each shoe at a following point; said shoes each comprising a pair of normally engaged matching halves pivotally mounted adjacent their inner ends for swinging movement in a separating direction, there being a normally closed but sectional point separable with said halves, said shoe opening means comprising a cam finger extending from each half of each shoe, and cams positioned on the frame and effective to engage and swing said fingers toward each other when the shoes reach said following point.

CLAUDE A. LOUCKS.

REFERENCES CITED

The following references are of record in the file of this patent:

UNITED STATES PATENTS

| Number | Name | Date |
|---|---|---|
| 263,064 | Shannon | Aug. 22, 1882 |
| 283,317 | Wunsche | Aug. 14, 1883 |
| 431,842 | Davis | July 8, 1890 |
| 504,500 | McWhorter | Sept. 5, 1893 |
| 827,857 | Fleak | Aug. 7, 1906 |
| 1,042,617 | Spaulding | Oct. 29, 1912 |
| 1,093,462 | Norris | Apr. 14, 1914 |
| 1,765,467 | Vollink | June 24, 1930 |
| 1,802,273 | Richards et al. | Apr. 21, 1931 |
| 2,174,120 | Cobbley et al. | Sept. 26, 1939 |

FOREIGN PATENTS

| Number | Country | Date |
|---|---|---|
| 101,052 | Austria | Sept. 25, 1925 |
| 530,439 | Germany | July 29, 1931 |